Figure 1:
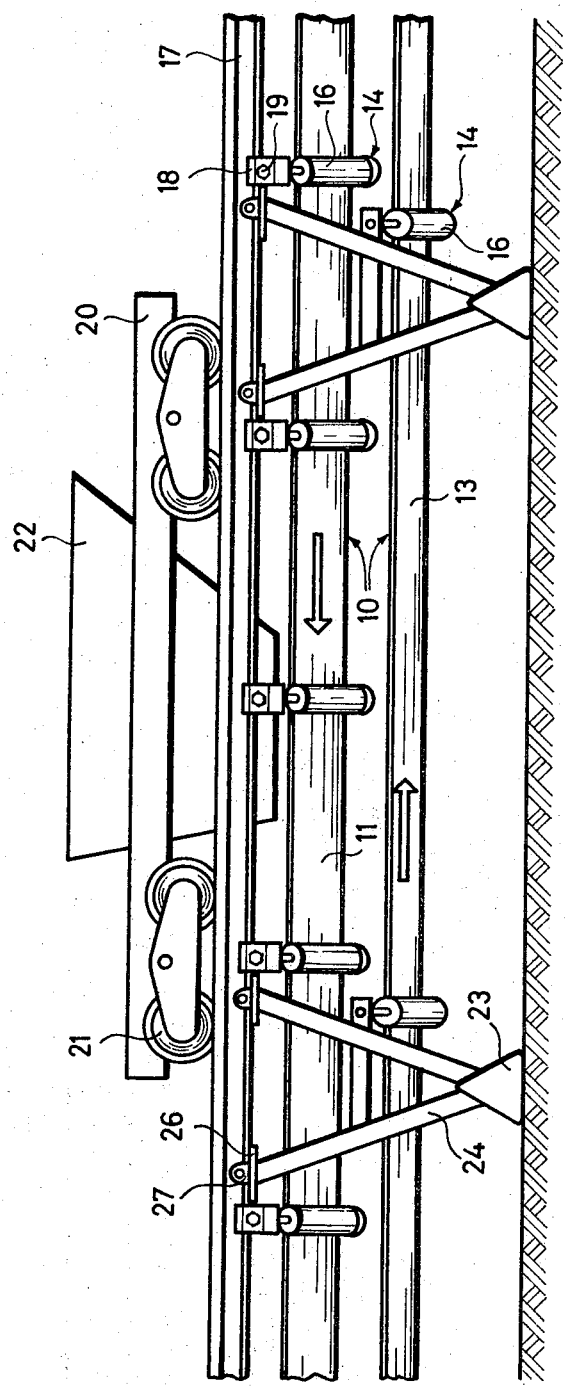

Oct. 24, 1967 T. SCHMIEDER 3,348,663
SUPPORTING STRUCTURE FOR MOVABLE BELT CONVEYORS
Filed Oct. 7, 1965 4 Sheets-Sheet 1

INVENTOR
Theodor Schmieder

BY *James E. Bryan*
ATTORNEY

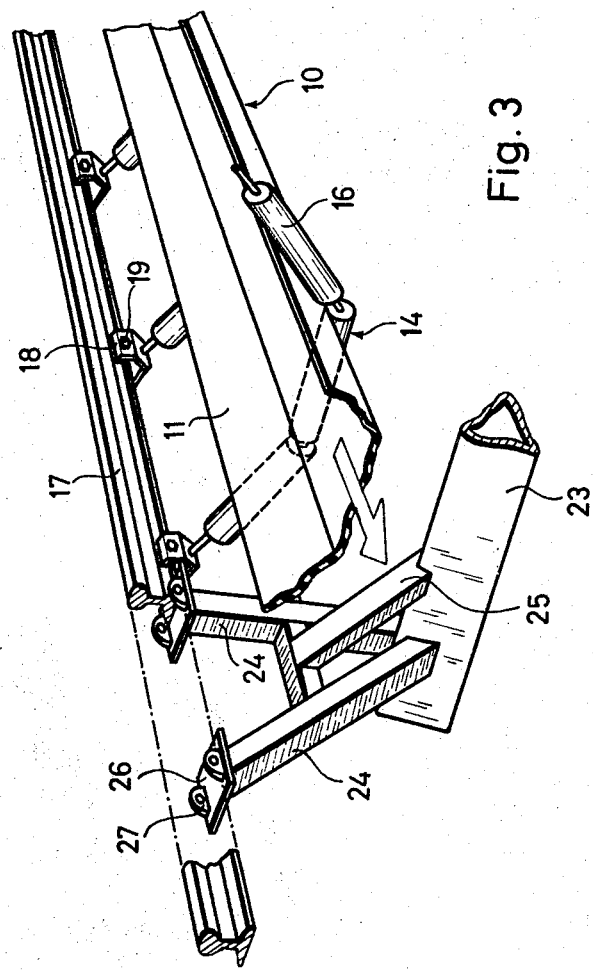

Oct. 24, 1967　　　　T. SCHMIEDER　　　　3,348,663
SUPPORTING STRUCTURE FOR MOVABLE BELT CONVEYORS
Filed Oct. 7, 1965　　　　　　　　　　　　4 Sheets-Sheet 4
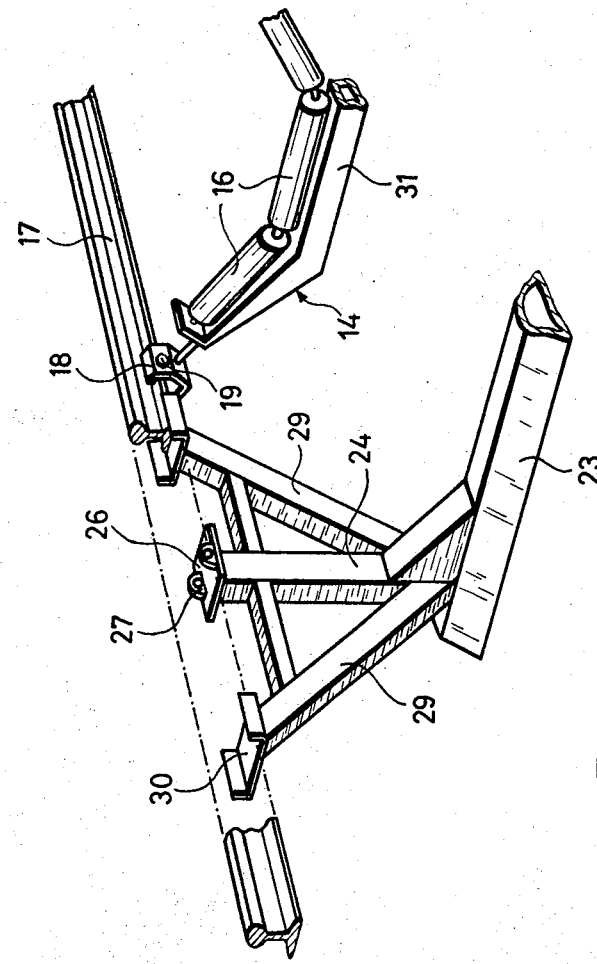
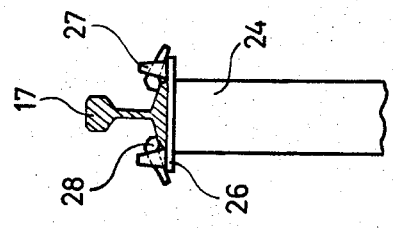
INVENTOR
Theodor Schmieder
BY *James E. Bryan*
ATTORNEY 3,348,663
SUPPORTING STRUCTURE FOR MOVABLE
BELT CONVEYORS
Theodor Schmieder, Bad Oeynhausen, Germany, assignor to Eisenwerk Weserhutte A.G., Oeynhausen, Germany, a corporation of Germany
Filed Oct. 7, 1965, Ser. No. 493,772
3 Claims. (Cl. 198—192)

This invention relates to belt conveyors of the type primarily employed in the mining and construction industries and, more particularly, to those which must be laterally shifted from time to time in accordance with the progress of loading equipment, such as an excavator. Heretofore, such lateral shifting generally has been effected by mounting the conveyor on the sleepers of a movable track whereby a roller attachment on the boom of a crane, traveling along the length of the conveyor, engages with the rails and effects the movement. The crane lifts the movable track slightly from the ground, shifts it laterally, and sets it down again.

In known designs, the actual supporting structure of the belt conveyor includes a number of rectangular frames with vertical supports which, in each case, are mounted separately on two of the sleepers of the movable track. A number of idler sets, over which the endless belt runs, are connected to these frames.

The primary disadvantage of the laterally movable belt conveyors as heretofore known resides in the massive supporting structure for the idler sets and the track sections. In addition, the rails mounted on the sleeepers just above ground level are a hindrance when spilled material must be removed from between the sleepers underneath the belt.

The present invention provides a supporting structure for laterally movable belt conveyors of a simple and light design which eliminates the use of all superfluous elements and employs only those structural elements which are absolutely essential. In the construction of the present invention, the rails, which are employed for shifting the conveyor, are mounted in a manner such that they no longer present a hindrance when spilled material must be removed from beneath the conveyor. Further, the position of the rails in the construction of the present invention permits the use thereof as a travel way or track for a hopper car which can travel with an excavator the entire length of the belt. Such hopper cars have been employed with movable conveyors heretofore, but they travel on rails additional to those which are employed for shifting the conveyor. In another construction heretofore employed, the hopper car travels on the shifting rails, which latter are supported on the sleepers, but, in such construction, the care must be of a portal-type design which, in addition to increasing the structural complexity thereof, adversely affects the stability.

The construction of the present invention provides a supporting structure for laterally movable conveyors which can be easily moved. Heretofore, this condition has not existed as the frames of the known supporting structures are very cumbersome and require a large amount of space.

Figure 2:
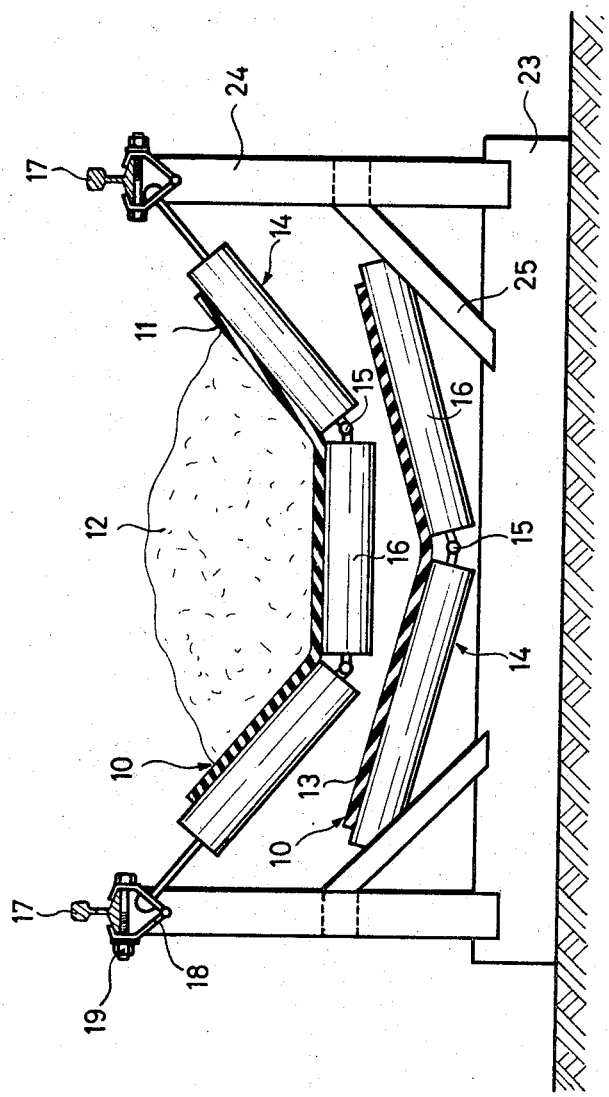

The invention will be further illustrated by reference to the accompanying drawings in which:

FIGURE 1 is a side view of one embodiment of the supporting structure for laterally movable conveyors according to the present invention, FIGURE 2 is a sectional view of a supporting structure shown in FIGURE 1, FIGURE 3 is a fragmentary perspective view of the supporting structure shown in FIGURES 1 and 2, FIGURE 4 is a detail of one method of securing the shifting rails to the supporting structure, and FIGURE 5 is a fragmentary perspective view of a modification of the supporting structure shown in FIGURES 1 to 3.

As shown in FIGURES 1 and 2, the laterally movable conveyor has an endless conveyor belt 10 which runs in two opposite directions. The upper, sharply troughed section 11 serves to carry material 12 to the head of the conveyor, whereas the lower belt section 13 returns empty to the original starting position at the rear end of the conveyor. Both the upper belt section 11 and the lower belt section 13 are supported by idler assemblies 14, including the conveyor idlers 16, which are connected to each other by the connecting links 15, for example.

An important feature of the present invention is the suspension of the idler assemblies 14 which support the upper section 11 of the conveyor belt 10. The idler assemblies are flexibly suspended at their outer ends from the rails 17 which run at either side of the conveyor belt 10. Clamps 18 are employed to suspend the idler assemblies from the rails, the clamps engaging the rail bases from the bottoms thereof and being clamped thereto by the bolts 19.

The rails 17 running on each side of he conveyor belt 10 perform two separate functions. First, they are necessary for laterally moving the supporting structure of the belt conveyor. The movement of the structure is performed in practice by using a crane having a roller attachment fitted to the boom. The roller attachment engages on the rails 17 and the crane, which travels back and forth along the length of the belt conveyor, raises the structure slightly from the ground and shifts it laterally at the same time. Also, the rails 17 can be used as a travel way or track for a traveling feed carriage or hopper car 22 running above the belt section 11, the wheels 21 of which hopper car run on the rails 17. Such feed carriage or hopper cars have, in addition to other equipment, a hopper 22 into which the material 12 from a shovel excavator is dumped and passes through to the conveyor belt 10.

The rails 17, which in designs of laterally movable conveyors heretofore known were fixed to the end of the sleepers 23, are, in the construction of the present invention, mounted at an appreciable distance above the sleepers 23. The supports 24 between the rails 17 and the sleepers 23 are particularly illustrated in FIGURE 3. These supports are welded in pairs to the sleepers 23 forming, together with the brace 25, a solid unit.

In order to permit a correct movement of the supporting structure of the belt conveyor illustrated, the basic principles applicable to other shiftable rail equipment apply, i.e., the rails 17 are not rigidly connected to the head plates 26 on the supports 24 but are so connected that a limited pivotal movement is possible. This requirement is best fulfilled by using known rail connecting methods which have been heretofore used in shiftable track equipment. In FIGURE 4, such a connection is illustrated in detail and consists of the rail fixtures 27, which are welded to the head plate 26 of the support 24, and the locking pins 28. The rail 17 to be connected to the head plate 26 lies with its base between the fixtures 27 and is secured in place by placing the pins 28 in the bores of the fixtures 27 whereby the pins lock themselves.

A variation of the laterally movable belt conveyor described above is shown in FIGURE 5. In the construction of this figure, the supports 24 no longer have a V-shape from the sleepers 23, as shown in FIGURE 3, but have a vertical position. The upper ends of the supports 24 each carry a head plate 26 on which the rails 17 rest and to which they are connected. Diagonal braces 29 extending from the point of attachment of the support 24 on the sleepers 23 protect the support 24 against tipping motions. The braces 29 are provided with slide plates 30 which fit on the undersides of the rails 17. The slide plates 30 are somewhat wider than the bases of the rails 17 so that during lateral shifting of the belt conveyor, an allowance for the lateral pivotal movement of the rail 17 is provided. However, the rails 17 must not slip or slide off of the slide plates 30 and, thus, the plates are provided with upturned sides.

FIGURE 5 also shows a variation in the idler assemblies 14 since, in this figure, the idlers are carried on cross-supports 31 which latter are suspended from the rails 17. The suspensions must be very flexible so that during lateral shifting of the belt conveyor any variation in rail gauge or displacement of the rails can be readily compensated.

It will be obvious to those skilled in the art that many modifications may be made within the scope of the present invention without departing from the spirit thereof, and the invention includes all such modifications.

What is claimed is:

1. A suporting structure for a laterally movable belt conveyor comprising a plurality of sleepers, a plurality of conveyor supports connected to the sleepers, means suspending a conveyor between the conveyor supports including sets of rollers mounted on axles pivotally suspended from the rails and connected to clamps engaging the rail bases, and a railroad rail mounted on top of the conveyor supports on each side of the conveyor by connecting means permitting a small pivotal movement between the rails and the supports.

2. A structure according to claim 1 in which the sides of the conveyor are suspended at the approximate height of the rail bases.

3. A structure according to claim 1 in which the means suspending the conveyor includes cross supports suspended from the rails.

References Cited

UNITED STATES PATENTS

| | | | |
|---|---|---|---|
| 873,991 | 12/1907 | Cunningham | 198—192 |
| 873,992 | 12/1907 | Cunningham | 198—192 |
| 1,177,353 | 3/1916 | Pratt | 214—46 |
| 2,638,276 | 5/1953 | Stamm | 238—349 |
| 3,200,940 | 8/1965 | Higgins | 198—192 |
| 3,225,899 | 12/1965 | Lo Presti et al. | 198—192 |

FOREIGN PATENTS

| | | |
|---|---|---|
| 228,885 | 3/1958 | Australia. |
| 972,092 | 7/1949 | Germany. |

EVON C. BLUNK, *Primary Examiner.*

M. L. AJEMAN, *Assistant Examiner.*